(12) United States Patent
Maksimovic et al.

(10) Patent No.: US 6,985,025 B1
(45) Date of Patent: Jan. 10, 2006

(54) SYSTEM FOR ADJUSTING A POWER SUPPLY LEVEL OF A DIGITAL PROCESSING COMPONENT AND METHOD OF OPERATING THE SAME

(75) Inventors: Dragan Maksimovic, Boulder, CO (US); Sandeep Dhar, Boulder, CO (US)

(73) Assignee: National Semiconductor Corporation, Santa Clara, CA (US)

( * ) Notice: Subject to any disclaimer, the term of this patent is extended or adjusted under 35 U.S.C. 154(b) by 467 days.

(21) Appl. No.: 10/053,858

(22) Filed: Jan. 19, 2002

(51) Int. Cl.
*G05F 1/10* (2006.01)

(52) U.S. Cl. .................... 327/540; 327/157
(58) Field of Classification Search ............. 327/148, 327/157, 540, 541, 543; 323/313, 315
See application file for complete search history.

(56) References Cited

U.S. PATENT DOCUMENTS

| | | | | |
|---|---|---|---|---|
| 4,922,141 A | * | 5/1990 | Lofgren et al. | 327/158 |
| 5,216,302 A | * | 6/1993 | Tanizawa | 327/157 |
| 5,646,563 A | * | 7/1997 | Kuo | 327/157 |
| 5,699,020 A | * | 12/1997 | Jefferson | 331/17 |
| 5,740,213 A | * | 4/1998 | Dreyer | 375/374 |
| 6,067,336 A | * | 5/2000 | Peng | 375/376 |
| 6,081,146 A | * | 6/2000 | Shiochi et al. | 327/277 |
| 6,130,565 A | * | 10/2000 | Nagano et al. | 327/157 |
| 6,157,247 A |  | 12/2000 | Abdesselem et al. | |
| 6,166,577 A | * | 12/2000 | Mizuno et al. | 327/278 |
| 6,188,637 B1 | * | 2/2001 | Ooishi | 365/233 |
| 6,356,157 B1 | * | 3/2002 | Kawamura | 331/11 |
| 6,470,060 B1 | * | 10/2002 | Harrison | 375/374 |
| 6,480,070 B2 | * | 11/2002 | Locher | 331/17 |
| 6,548,991 B1 | * | 4/2003 | Maksimovic et al. | 323/224 |

FOREIGN PATENT DOCUMENTS

| | | |
|---|---|---|
| EP | 1 164 454 A1 | 12/2001 |
| JP | 08136621 | 5/1996 |

* cited by examiner

*Primary Examiner*—Terry D. Cunningham

(57) ABSTRACT

There is disclosed control circuitry for adjusting a power supply level, VDD, of a digital processing component having varying operating frequencies. The control circuitry comprises N delay cells and power supply adjustment circuitry. The N delay cells are coupled in series, each of which has a delay D determined by a value of VDD, such that a clock edge applied to an input of a first delay cell ripples sequentially through the N delay cells. The power supply adjustment circuitry capable of adjusting VDD and is operable to (i) monitor outputs of at least a K delay cell and a K+1 delay cell, (ii) determine that the clock edge has reached an output of the K delay cell and has not reached an output of the K+1 delay cell, and (iii) generate a control signal capable of adjusting VDD in response thereto.

30 Claims, 5 Drawing Sheets

SYSTEM FOR ADJUSTING A POWER SUPPLY LEVEL OF A DIGITAL PROCESSING COMPONENT AND METHOD OF OPERATING THE SAME

CROSS-REFERENCE TO RELATED APPLICATIONS

The present invention is related to those disclosed in the following U.S. patent applications:
1. Ser. No. 10/053,226, filed concurrently herewith, entitled "AN ADAPTIVE VOLTAGE SCALING DIGITAL PROCESSING COMPONENT AND METHOD OF OPERATING THE SAME;"
2. Ser. No. 10/053,227, filed concurrently herewith, entitled "AN ADAPTIVE VOLTAGE SCALING CLOCK GENERATOR FOR USE IN A DIGITAL PROCESSING COMPONENT AND METHOD OF OPERATING THE SAME;" and
3. Ser. No. 10/053,228, filed concurrently herewith, entitled "AN ADAPTIVE VOLTAGE SCALING POWER SUPPLY FOR USE IN A DIGITAL PROCESSING COMPONENT AND METHOD OF OPERATING THE SAME."

The above applications are commonly assigned to the assignee of the present invention. The disclosures of these related patent applications are hereby incorporated by reference for all purposes as if fully set forth herein.

TECHNICAL FIELD OF THE INVENTION

The present invention is generally directed to low power integrated circuits and, more specifically, to systems for adjusting a power supply level of a digital processing component and methods of operating the same.

BACKGROUND OF THE INVENTION

In recent years, there have been great advancements in the speed, power, and complexity of integrated circuits (ICs), such as application specific integrated circuit (ASIC) chips, central processing unit (CPU) chips, digital signal processor (DSP) chips and the like. These advancements have made possible the development of system-on-a-chip (SOC) devices, among other things. A SOC device integrates into a single chip all (or nearly all) of the components of a complex electronic system, such as a wireless receiver (i.e., cell phone, a television receiver, and the like).

An important criteria in evaluating the performance of an electronic device is power consumption. Minimizing power consumption has long been an important design consideration in portable devices that operate on battery power. Since maximizing battery life is a critical objective in a portable device, it is essential to minimize the power consumption of ICs used in the portable device. More recently, minimizing power consumption has also become more important in electronic devices that are not portable. The increased use of a wide variety of electronic products by consumers and businesses has caused corresponding increases in the electrical utility bills of homeowners and business operators. The increased use of electronic products also is a major contributor to the increased electrical demand that has caused highly publicized power shortages in the United States, particularly California.

Many complex electronic components, such as CPUs and DSPs, are capable of operating a number of different clock speeds. Generally speaking, if an electronic component operates at a slower speed, it uses less power because there are less signal level transitions in a given time period during which power is consumed. The speed at which logic gates switch in a DPU and DSP is directly affected by the level of the power supply, VDD, connected to the gates. As VDD gets larger, there is greater voltage and current to drive gates, so rise times and propagation delays across gates decrease. Conversely, as VDD gets smaller, rise times and propagation delays across gates increase. Thus, if a CPU or DSP must operate a relatively high clock frequency, such as 800 MHz, VDD is set to a high level, such as +3.3 volts or +2.4 volts. If a CPU or DSP can operate a relatively slow clock frequency, such as 50 MHz, VDD may be set to a low level, such as +1.2 volts.

Unfortunately, prior art applications do not provide any means for finely adjusting the level of VDD to a wide number of clock speeds. Typically, a DSP or CPU may operate in only two modes: a +3.3 volt high power mode and a +1.2 volt low power mode, for example. Thus, in the example above, if the CPU or DSP must operate at 100 MHz instead of 50 MHz, the +1.2 volt VDD level used at 50 MHz may not be sufficient to operate at 100 MHz. Thus, the DSP or CPU will be required to operate at VDD of +3.3 volts. However, at a VDD level of +3.3 volts, the CPU or DSP may consume far more power that is necessary to operate at 100 MHz.

Therefore, there is a need in the art for circuits and methods for finely adjusting the level of VDD in a large scale digital integrated circuit (e.g., DSP, CPU) to match a wide number of clock speeds. In particular, there is a need for circuits and methods that finely adjust VDD to an optimum level to ensure that the rise times and propagation delays of the large scale digital integrated circuit are closely matched to the clock speed at which the large scale digital integrated circuit operates.

SUMMARY OF THE INVENTION

To address the above-discussed deficiencies of the prior art, it is a primary object of the present invention to provide a critical path slack-time discriminator for dynamic adaptive voltage scaling regulators. According to one advantageous embodiment, control circuitry is introduced for adjusting a power supply level (VDD) of a digital processing component having varying operating frequencies.

The control circuitry comprises N delay cells and power supply adjustment circuitry. The N delay cells are coupled in series, each of which has a delay (D) determined by a value of VDD, such that a clock edge applied to an input of a first delay cell ripples sequentially through the N delay cells.

The power supply adjustment circuitry, which is associated with the N delay cells, is capable of adjusting VDD and is operable to (i) monitor outputs of at least a K delay cell and a K+1 delay cell, (ii) determine that the clock edge has reached an output of the K delay cell and has not reached an output of the K+1 delay cell, and (iii) generate a control signal capable of adjusting VDD in response thereto.

In another embodiment, the power supply adjustment circuitry determines whether the clock edge has reached the K delay cell output but not reached the K+1 delay cell output when a next sequential clock edge is applied to the first delay cell input.

In a related embodiment, a total delay from the first delay cell input to the K delay cell output is greater than a maximum delay of the digital processing component.

In another related embodiment, the power supply adjustment circuitry is further operable to (i) increase VDD if the clock edge has not reached the K delay cell output, and (ii) decrease VDD if the clock edge has reached the K+1 delay cell output.

In another related embodiment, the power supply adjustment circuitry is further operable to monitor outputs of at least a K−1 delay cell, the K delay cell, the K+1 delay cell, and a K+2 delay cell. According to this embodiment, the power supply adjustment circuitry is further operable to determine that the clock edge has reached an output of the K−1 delay cell and the K delay cell output, but not reached at least the K+1 delay cell output. The power supply adjustment circuitry is then further operable to (i) increase VDD (a) in relatively large incremental steps if the clock edge has not reached the K−1 delay cell output or (b) in relatively small incremental steps if the clock edge has reached the K−1 delay cell output but has not reached the K delay cell output, and (ii) decrease VDD (a) in relatively large incremental steps if the clock edge has reached the K+1 delay cell output and the K+2 delay cell output or (b) in relatively small incremental steps if the clock edge has reached the K+1 delay cell output but has not reached the K+2 delay cell output.

According to another advantageous embodiment, a digital circuit is introduced that includes a digital processing component having dynamic adaptive voltage scaling. The digital circuit further includes an adjustable clock source, an adjustable power supply and control circuitry for adjusting a variable power supply level, VDD.

The digital processing component is capable of operating at different clock frequencies. The adjustable clock source is capable of supplying variable clock frequencies to the digital processing component. The adjustable power supply is capable of supplying VDD to the digital processing component. The control circuitry comprises N delay cells and power supply adjustment circuitry.

The N delay cells are coupled in series, each of which has a delay (D) determined by a value of VDD, such that a clock edge applied to an input of a first delay cell ripples sequentially through the N delay cells. The power supply adjustment circuitry, which is associated with the N delay cells, is capable of adjusting VDD and is operable to (i) monitor outputs of at least a K delay cell and a K+1 delay cell, (ii) determine that the clock edge has reached an output of the K delay cell and has not reached an output of the K+1 delay cell, and (iii) generate a control signal capable of adjusting VDD in response thereto.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "circuitry" means any circuit, device, component or part thereof that controls at least one operation, such circuitry may, if appropriate, be implemented in hardware, firmware or software, or some combination of at least two of the same, as the case may be. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 6, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged digital processing system.

Figure 1:
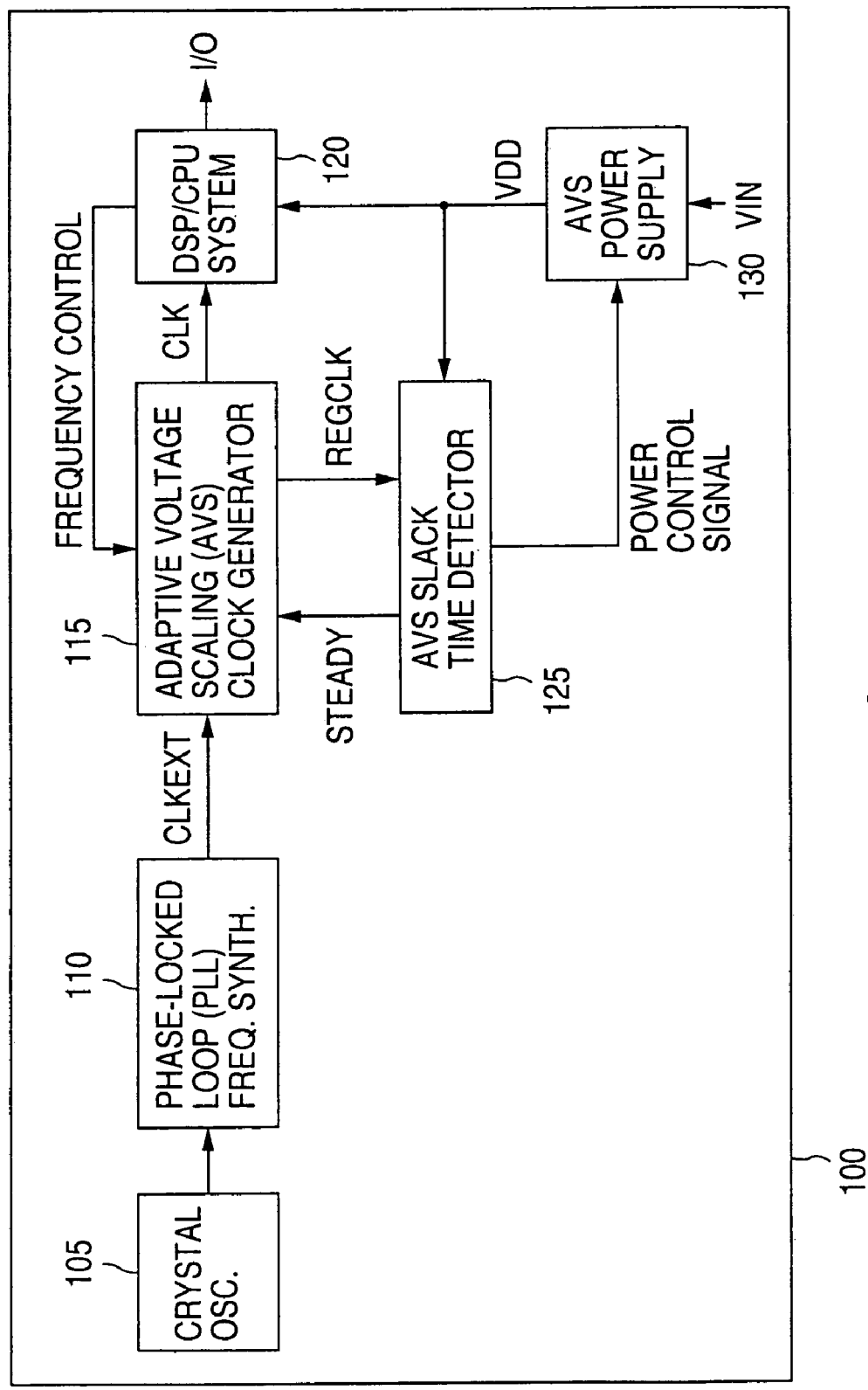
FIG. 1 illustrates a block diagram of digital processing system according to one exemplary embodiment of the present invention.

FIG. 1 illustrates a block diagram of digital processing system 100 according to one exemplary embodiment of the present invention. Digital processing system 100 comprises crystal oscillator 105, phase-locked loop (PLL) frequency synthesizer 110, adaptive voltage scaling (AVS) clock generator 115, a digital processing component, labeled DSP/CPU system 120, adaptive voltage scaling (AVS) slack-time detector 125, and adaptive voltage scaling (AVS) power supply 130.

Exemplary crystal oscillator 105 generates an output reference frequency signal in which the reference frequency of the output is determined by the mechanical properties of a piezoelectric crystal. Exemplary PLL frequency synthesizer 110 is coupled to the output of crystal oscillator 105 and generates CLKEXT signal, which has an operating frequency that is a multiple of the reference frequency provided by crystal oscillator 105. The CLKEXT signal may represent a set of clock frequencies.

Exemplary AVS clock generator 115 is coupled to the output of PLL frequency synthesizer 110, digital processing component 120 and AVS slack-time detector 125 and respectively receives as inputs CLKEXT signal, a FREQUENCY CONTROL signal and a STEADY signal. The FREQUENCY CONTROL signal sets the desired operating clock frequency, $f_{clk}$, which is typically some fraction of the CLKEXT signal. For example, if the CLKEXT signal is 1.6 Ghz, AVS clock generator 115 may divide the CLKEXT signal by four to produce a 400 MHz clock as the CLK signal supplied to DSP/CPU system 120. As will be explained below in greater detail, the STEADY signal indicates to AVS clock generator 115 that the power supply voltage, VDD, has been adjusted to a sufficient level to match the desired clock speed of the CLK signal. When STEADY is enabled, the CLK signal is applied to DSP/CPU system 120.

In operation, if the desired operating frequency is lower than the current operating frequency, the frequencies of both the system clock CLK and the regulator clock signal, REGCLK, are changed at the same time to the new value $f_{regclk}=a(f_{clk})$, where a is a constant, for example a=1 or a=½. If the desired operating frequency is higher than the current operating frequency, the frequency of REGCLK is changed first. Then, when the VDD supply voltage reaches the new steady-state value, the STEADY signal is activated, and the system clock frequency is updated to $f_{clk}=f_{regclk}/a$. If a=1, in steady state, CLK and REGCLK have the same frequency and phase.

Generally, speaking DSP/CPU system 120 may be any digital processing component designed for performing mathematical computations and may suitably be programmable, meaning that digital processing component 120 may be used for manipulating different types of information, including sound, images, video, and the like. According to the present embodiment, DSP/CPU system 120 has varying operating frequencies and is coupled to the output of AVS clock generator 115 and AVS power supply 130. DSP/CPU system 120 generates the FREQUENCY CONTROL signal, and communicates input/output (I/O) data with an associated processing system (not shown (e.g., mobile communication unit, computing system, and the like).

Exemplary AVS slack-time detector 125 is a critical path slack-time discriminator in accordance with the principles of the present invention. AVS slack-time detector 125 comprises N delay cells and power supply adjustment circuitry (shown with reference to FIG. 2), and operable to control AVS power supply 130 to adjust VDD. The N delay cells are coupled in series, each of which has a delay (D) determined by a value of VDD, such that a clock edge applied to an input of a first delay cell ripples sequentially through the N delay cells. The power supply adjustment circuitry, which is associated with the N delay cells, is capable of adjusting VDD and is operable to (i) monitor outputs of at least a K delay cell and a K+1 delay cell, (ii) determine that the clock edge has reached an output of the K delay cell and has not reached an output of the K+1 delay cell, and (iii) generate a control signal capable of adjusting VDD in response thereto.

Figure 2:
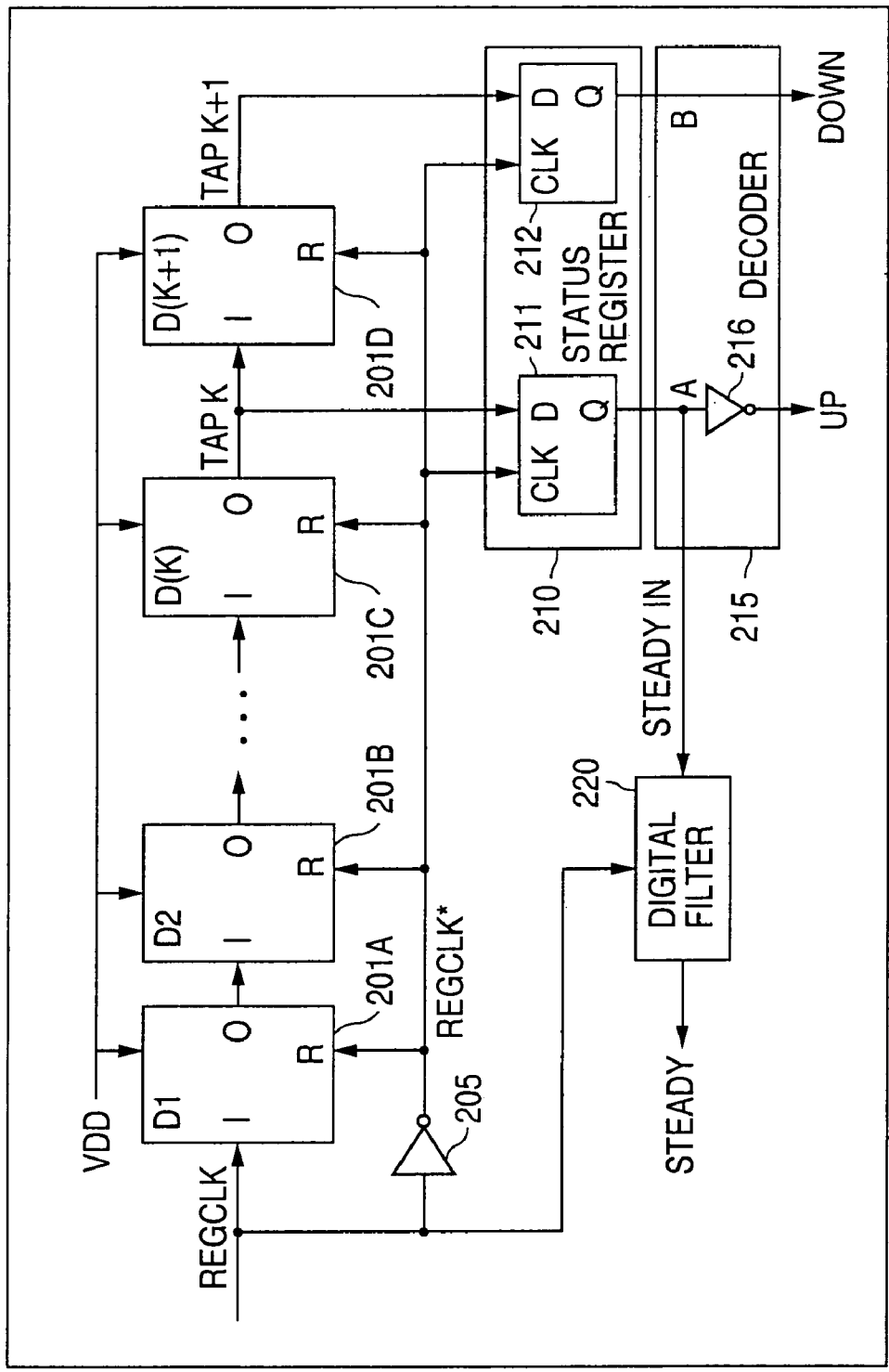
FIG. 2 illustrates the adaptive voltage scaling (AVS) slack time detector of FIG. 1 in greater detail according to an exemplary embodiment of the present invention.

FIG. 2 illustrates AVS slack time detector 125 in greater detail according to an exemplary embodiment of the present invention. AVS slack time detector 125 comprises N sequential delay cells 201, including exemplary delay cells 201A, 201B, 201C, and 201D, inverter 205, status register 210, decoder 215, and digital filter 220. Status register 210 further comprises edge-triggered flip-flop (FF) 211 and edge-triggered flip-flop (FF) 212. Decoder 215 comprises inverter 216.

A rising edge on the REGCLK clock signal will ripple sequentially through each of the delay cells in the chain of N sequential delay cells 201. The N delay cells 201 are identical components and are made from the same process as the gates in DSP/CPU system 120. Thus, each of the delay cells in the chain of N delay cells has a variable propagation delay, D, between its input (I) and its output (O) that is substantially equal to the variable propagation delay, D, of all of the other N delay cells 201. The propagation delays are said to be variable because the level of the power supply, VDD, affects the propagation delay, D. As VDD increases, the propagation delay, D, of each of the N delay cells 201 decreases. As VDD decreases, the propagation delay, D, of each of the N delay cells 201 increases.

Thus, for a given value of VDD, the combined propagation delay from the input of the first delay cell (i.e., delay cell 201A) to the output of the K delay cell (i.e., delay cell 201C) is K·D (i.e., K times D). Exemplary delay cells 201A, 201B, 201C, and 201D are sequentially labeled by their respective delay periods D1, D2, D(K), and D(K+1). The combined propagation delay, K×D, from the input of the first delay cell to the output of the K delay cell is designed to model the longest propagation delay through DSP/CPU system 120, including a safety margin of M propagation delays, scaled by an appropriate factor in case a≠1. For example, if the longest propagation delay through DSP/CPU system 120 is less than or equal to 6D (i.e., six propagation delays), then the value of K may be set to 8, so that the output of the K delay cell represents eight propagation delays (8D) and the safety margin, M, is two propagation delays. In an alternate embodiment, the value of K may be set to 7, so that the output of the K delay cell represents seven propagation delays (7D) and the safety margin, M, is one propagation delay. In still another alternate embodiment, the value of K may be set to 9, so that the output of the K delay cell represents nine propagation delays (9D) and the safety margin, M, is three propagation delays.

If the value of VDD increases, the longest propagation delay through DSP/CPU system 120 decreases and if the value of VDD decreases, the longest propagation delay through DSP/CPU system 120 increases. However, since the delay cells 201 are fabricated from the same process as the gates in DSP/CPU system 120, the combined delay, K·D, at the output of the K delay cell (i.e. delay cell 201C) changes proportionally, thereby tracking the longest propagation delay through DSP/CPU system 120. The purpose of AVS slack time detector 125 is to control the level of VDD so that a rising edge on the REGCLK clock signal received at the input of delay cell 201A propagates to the output of the K delay cell (i.e., delay cell 201C), but not to the output of the K+1 delay cell, by the time a falling edge on the REGCLK clock signal is received. If the rising edge propagates to the output of the K+1 delay cell (i.e., delay cell 201D) or beyond, then VDD is too large for the current clock speed of the REGCLK clock signal and power is being wasted. If the rising edge does not propagate at least as far as the output of the K delay cell (i.e., delay cell 201C), then VDD is too low for the current clock speed of the REGCLK clock signal and an error may occur due to the longest propagation delay through DSP/CPU system 120.

Figure 3:
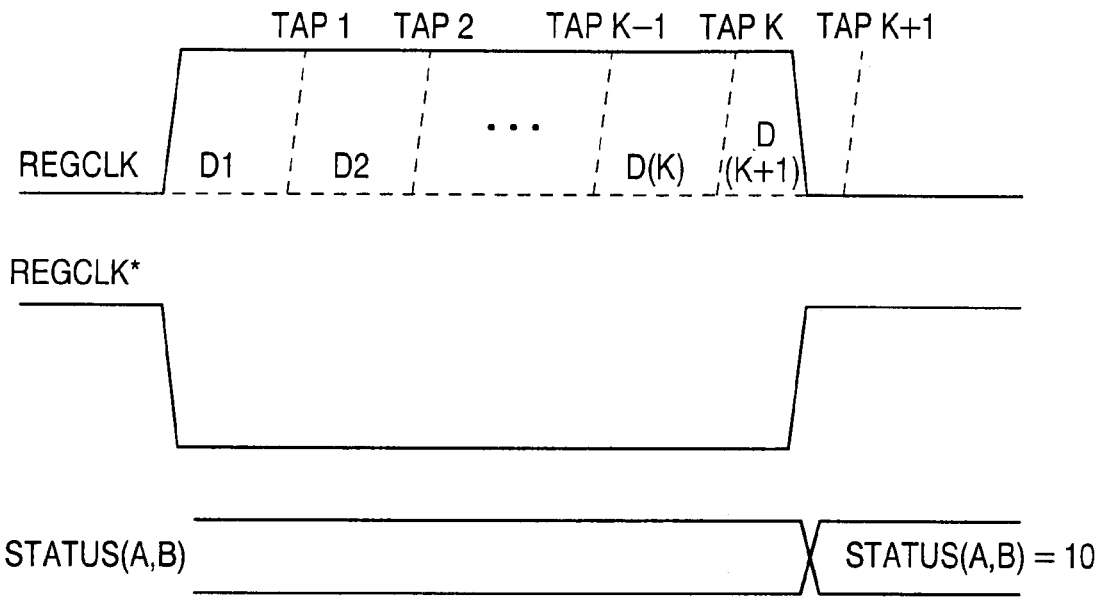
FIG. 3 illustrates a timing diagram illustrating the operation of the adaptive voltage scaling (AVS) slack time detector according to the exemplary embodiment illustrated in FIG. 2.

FIG. 3 is a timing diagram illustrating the operation of AVS slack time detector 125 according to the exemplary embodiment illustrated in FIG. 2. One illustrative clock pulse is shown. Initially, the REGCLK clock signal is low (Logic 0). Inverter 205 inverts the REGCLK clock signal to produce the REGCLK* clock signal, which is applied to the reset (R) inputs of each of the N delay cells 201. Initially, the REGCLK* clock signal is high (Logic 1), which forces the output (O) of each delay cell 201 to Logic 0.

When the REGCLK clock signal goes to Logic 1 (i.e., rising edge of clock pulse), the REGCLK* clock signal goes to Logic 0, thereby removing the reset (R) signal from all of the delay cells 201. After a first propagation delay, D1, the output of delay cell 201A, referred to as Tap 1, goes to Logic 1 (as shown by dotted line). After a second propagation delay, D2, the output of delay cell 201B, referred to as Tap 2, goes to Logic 1.

The rising edge continues to propagate through the chain of N delay cells 201.

After the K propagation delay, D(K), the output of delay cell 201C, referred to as Tap K, goes to Logic 1 (as shown by dotted line).

After the K+1 propagation delay, D(K+1), the output of delay cell 201D, referred to as Tap K+1, would normally go to Logic 1. However, the falling edge of the REGCLK clock signal occurs before the K+1 propagation delay completes. The falling edge of the REGCLK clock signal causes the REGCLK* clock signal to go to Logic 1 (i.e., rising edge), thereby applying a reset (R) signal to all of the N delay cells 201 and resetting the outputs (O) of all delay cells 201 back to Logic 0.

Flip-flop (FF) 211 in status register 210 monitors the output of delay cell 201C (i.e., Tap K) and flip-flop (FF) 212 in status register 210 monitors the output of delay cell 201D (i.e., Tap K+1). The rising edge of the REGCLK* clock signal causes FF 211 and FF 212 to read the values of the outputs of delay cells 201C and 201D before the outputs are reset. Thus, the status of the outputs of delay cells 201C and 201D, referred to as STATUS(A,B), are read on every falling edge of the REGCLK clock signal (i.e., the rising edge of the REGCLK* clock signal).

Under optimum conditions, the rising edge of the REGCLK clock signal propagates only as far as the output of the K delay cell (i.e., delay cell 201C). Thus, under optimum conditions, A=1, B=0, and STATUS(A,B)=10. If VDD is too low, the rising edge of the REGCLK clock signal fails to propagate as far as the output of the K delay cell and STATUS(A,B)=00. If VDD is too high, the rising edge of the REGCLK clock signal propagates at least as far as the output of the K+1 delay cell and STATUS(A,B)=11.

Decoder 215 reads the value of STATUS(A,B) and produces the control signal UP, which increases VDD, and the control signal DOWN, which decreases VDD, accordingly. Under optimum conditions, STATUS(A,B)=10, so that UP=0 and DOWN=0, and VDD is not changed. If VDD is too low, STATUS(A,B)=00, so that UP=1 and DOWN=0, and VDD is increased. If VDD is too high, STATUS(A,B)=11, so that UP=0 and DOWN=1, and VDD is decreased.

According to an exemplary embodiment, the value of A, which corresponds to the K delay cell output is, represents the raw signal, STEADY IN. The STEADY IN signal may fluctuate between 0 and 1 until the value of VDD is adjusted to a stable level. Digital filter 220 receives STEADY IN and determines when STEADY IN has become stable at Logic 1 before setting the STEADY signal at its output to Logic 1, thereby enabling AVS clock generator 115. For example, digital filter 220 may be a counter that counts ten consecutive values of STEADY IN=1 before the STEADY signal is set to Logic 1. If STEADY IN switches to a Logic 0 before a count of ten is reached, the counter is reset to zero and the count starts over.

Figure 4A:
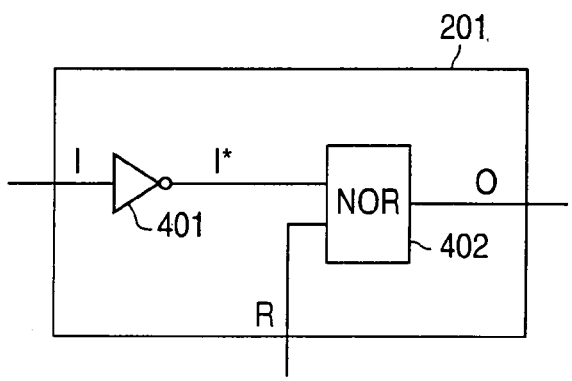
FIG. 4A illustrates an exemplary delay cell according to a first exemplary embodiment of the present invention.

FIG. 4A illustrates exemplary delay cell 201 according to a first exemplary embodiment of the present invention. Delay cell 201 comprises inverter 401 and NOR gate 402. When the reset signal (R) is Logic 1, the output (O) of NOR gate 402 is forced to Logic 0 and the input (I) is irrelevant. When the reset signal (R) is Logic 0, the input I can pass through to the output (O) of NOR gate 402. Thus, if R=0, a rising edge at the input (I) of delay cell 201 is inverted by inverter 401 and inverted again by NOR gate 401. Thus, a rising edge appears at the output (O) of delay cells 201 after a total delay equal to the combined propagation delays of inverter 401 and NOR gate 402.

Figure 4B:
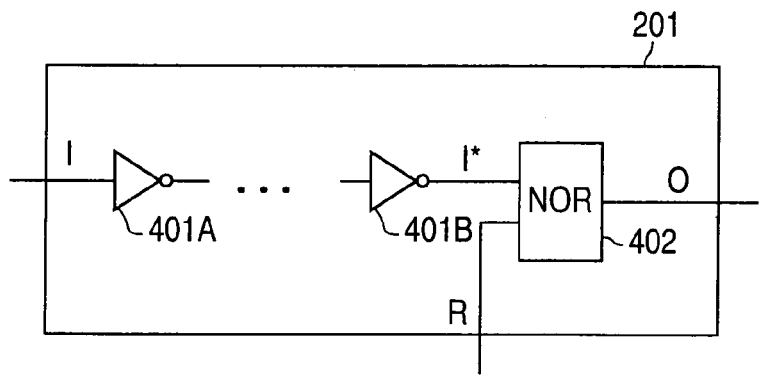
FIG. 4B illustrates an exemplary delay cell according to a second exemplary embodiment of the present invention.

FIG. 4B illustrates exemplary delay cell 201 according to a second exemplary embodiment of the present invention. Delay cell 201 comprises NOR gate 402 and an odd number of sequential inverters 401, including exemplary inverters 401A and 401B, and NOR gate 402. When the reset signal (R) is Logic 1, the output (O) of NOR gate 402 is forced to Logic 0 and the input (I) is irrelevant. When the reset signal (R) is Logic 0, the input I can pass through to the output (O) of NOR gate 402. Thus, if R=0, a rising edge at the input (I) of delay cell 201 is sequentially inverted an odd number of times by inverters 401A through 401B, and is then inverted one last time by NOR gate 401. Thus, an even number of inversions occur and a rising edge appears at the output (O) of delay cells 201 after a total delay equal to the combined propagation delays of NOR gate 402 and all of the inverters 401A through 401B. Thus, the total delay of delay cell 201 may be manipulated by varying the number of inverters 401 in delay cell 201. Also, those skilled in the art will recognize that other types of gates that perform an inverting function may be used in place of simple inverters 401. In general, any type of gate that receives an input I and generates an inverted output, I*, may be used.

Figure 5:
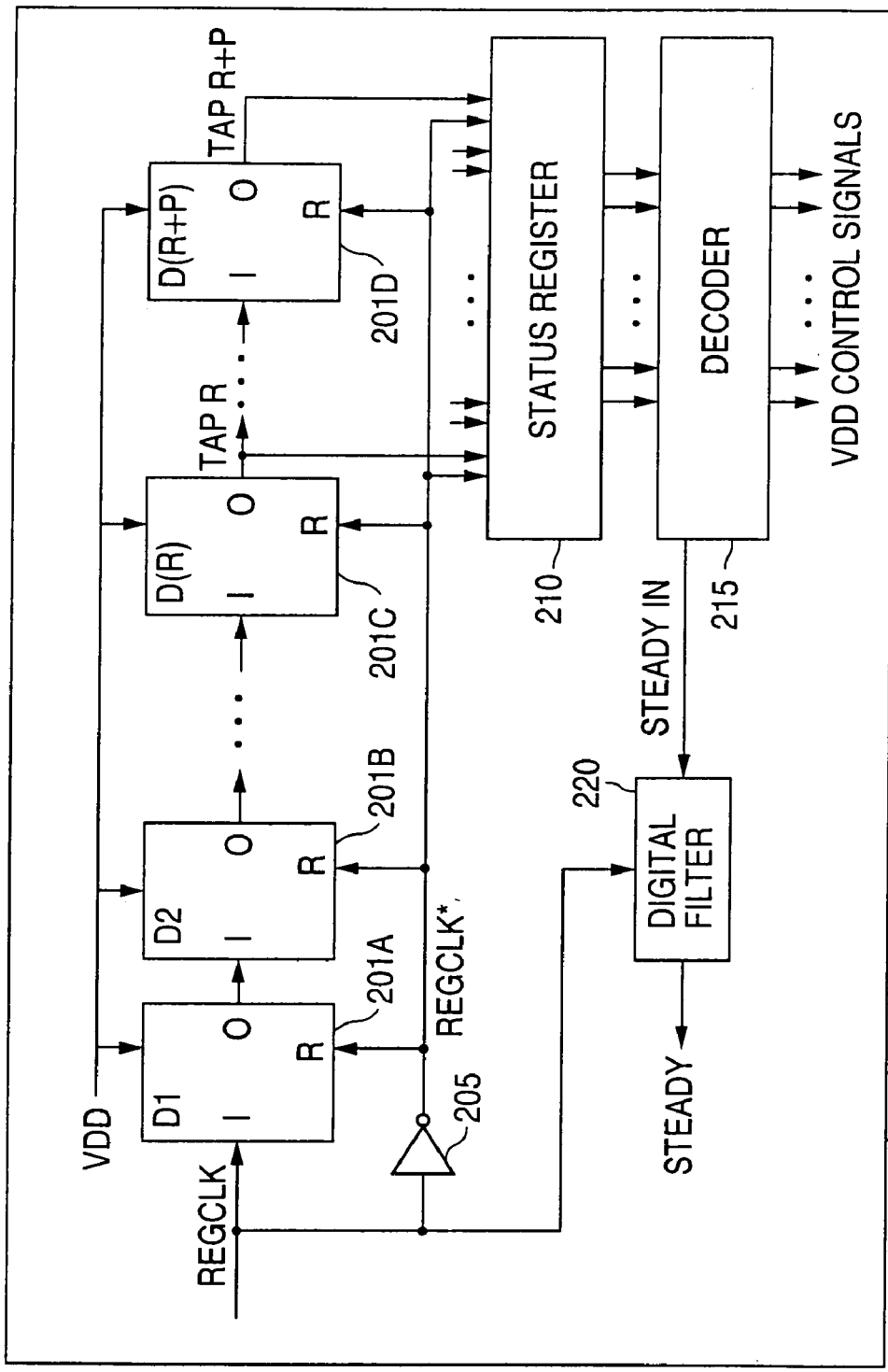
FIG. 5 illustrates an adaptive voltage scaling (AVS) slack time detector according to an alternate exemplary embodiment of the present invention.

FIG. 5 illustrates AVS slack time detector 125 in greater detail according to an alternate exemplary embodiment of the present invention. The first embodiment of AVS slack time detector 125 illustrated in FIG. 2 produced two control signals, namely UP and DOWN, which could be used to adjust the level of VDD in relatively coarse incremental steps or relatively coarse decremental steps. According to the exemplary embodiment illustrated in FIG. 5, AVS slack time detector 125 produces a plurality of control signals that may be used to increment or decrement the level of VDD by relatively small amounts and relatively large amounts.

AVS slack time detector 125 in FIG. 5 is identical in most respects to AVS slack time detector 125 illustrated in FIG. 2. The principal difference is in the number of delay cell 201 outputs that are monitored. AVS slack time detector 125 in FIG. 2 only monitored two delay cell 201 outputs (i.e., K and K+1). AVS slack time detector 125 in FIG. 5 monitors the outputs of more than the two delay cells 201. In FIG. 5, status register 210 monitors the outputs of Tap R through Tap R+P, which represent a total of P+1 delay cell 201 outputs.

Consider an exemplary embodiment in which the longest propagation delay through DSP/CPU system 120 is less than or equal to 6D (i.e., six propagation delays). If the safety margin, M, is one propagation delay and P equals 3, then Tap R is the output of the $7^{th}$ delay cell, Tap R+1 is the output of the $8^{th}$ delay cell, Tap R+2 is the output of the $9^{th}$ delay cell, and Tap R+3 is the output of the $10^{th}$ delay cell. These four delay cell outputs represent the outputs of the K−1 delay cell, the K delay cell, the K+1 delay cell, and the K+2 delay cell, respectively.

Again, the purpose of AVS slack time detector 125 is to control the level of VDD so that a rising edge on the REGCLK clock signal received at the input of delay cell 201A propagates to the output of the K delay cell (Tap R+1), but not to the output of the K+1 delay cell (Tap R+2), by the time a falling edge on the REGCLK clock signal is received. Thus, under optimum conditions, the value of STATUS (K−1,K,K+1,K+2)=1100. However, unlike the case in FIG. 2, decoder 215 in FIG. 5 may generate a plurality of VDD control signals having different incremental step sizes or decremental step sizes according to the value of STATUS (K−1,K,K+1,K+2).

For example, if STATUS(K−1,K,K+1,K+2) is 0000, then decoder 215 may generate a LARGE UP control signal that increments VDD by a relatively large amount (e.g., +0.1 volt step size). This corrects VDD more rapidly for large errors. If STATUS(K−1,K,K+1,K+2) is 1000, then decoder 215 may generate a SMALL UP control signal that increments VDD by a relatively small amount (e.g., +0.01 volt step size). This increases VDD by small amounts for small errors without causing an overshoot.

For example, if STATUS(K−1,K,K+1,K+2) is 1111, then decoder 215 may generate a LARGE DOWN control signal that decrements VDD by a relatively large amount (e.g., −0.1 volt step size). This corrects VDD more rapidly for large errors. If STATUS(K−1,K,K+1,K+2) is 1110, then decoder 215 may generate a SMALL DOWN control signal that decrements VDD by a relatively small amount (e.g., −0.01 volt step size). This decreases VDD by small amounts for small errors without causing an undershoot.

In still another embodiment of the present invention, status register 210 may monitor, for example, six (6) delay cell 201 outputs, thereby giving even greater degrees of fine and coarse adjustments of the level of VDD. For example, under optimum conditions, the value of STATUS(K−2,K−1, K,K+1,K+2, K+3)=111000. If STATUS(K−2,K−1,K,K+1, K+2, K+3)=000000, 100000, or 110000, then decoder 215 may generate LARGE UP, MEDIUM UP or SMALL UP control signals, respectively. If STATUS(K−2,K−1,K,K+1, K+2, K+3)=111111, 111110, or 111100, then decoder 215 may generate LARGE DOWN, MEDIUM DOWN or SMALL DOWN control signals, respectively.

In the foregoing embodiments, the operation of AVS slack time detector 125 was described in terms of two trigger events, namely a first occurring rising edge of the REGCLK clock signal and the subsequent falling edge of the REGCLK clock signal, that are used to monitor the slack time and control the level of VDD. However, this is by way of illustration only and should not be construed so as to limit the scope of the present invention. Those skilled in the art will recognize that AVS slack time detector 125 may be easily reconfigured so that a first occurring falling edge of the REGCLK clock signal and a subsequent rising edge of the REGCLK clock signal may be used as trigger events to monitor the slack time and control the level of VDD.

Figure 6:
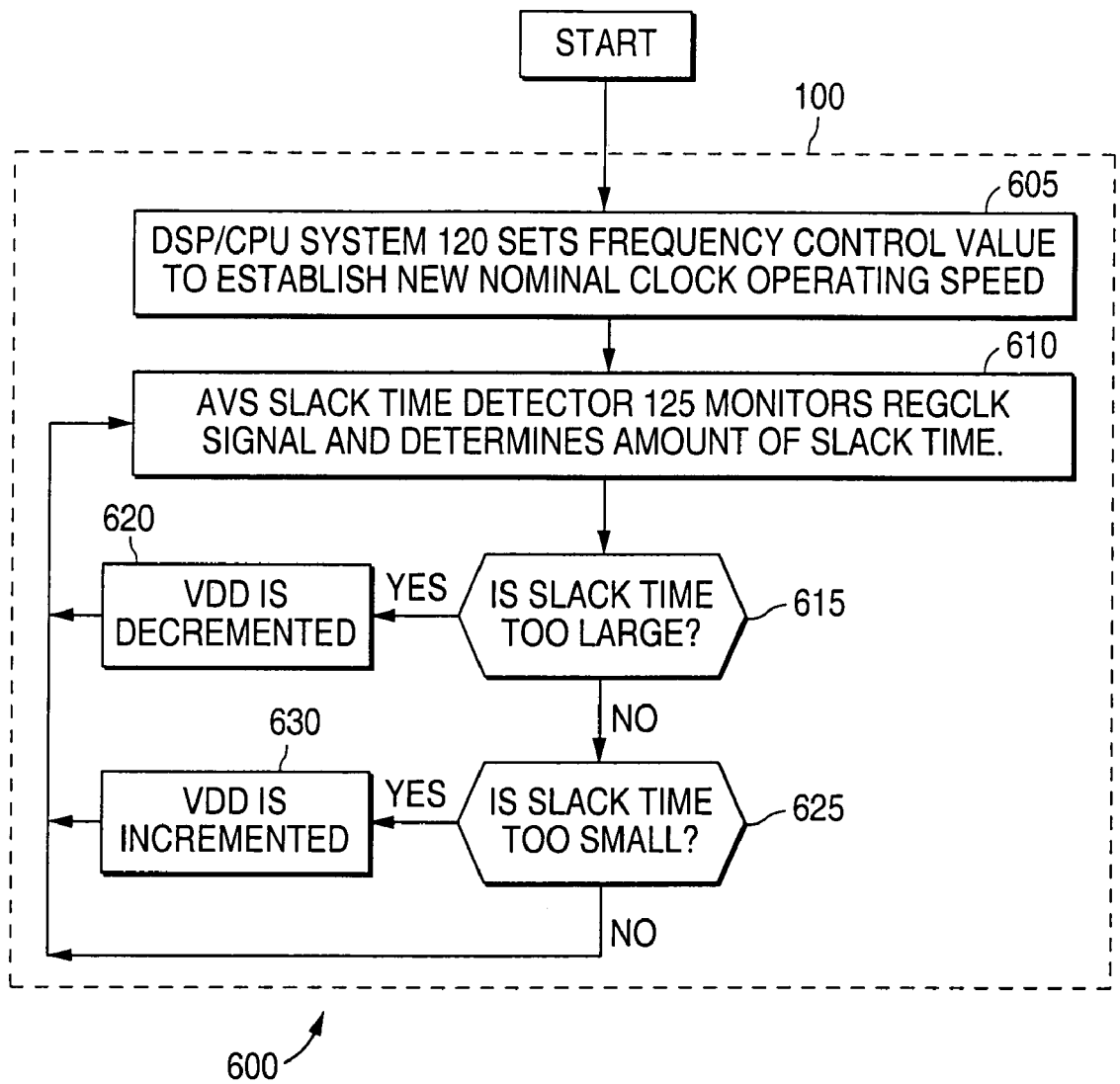
FIG. 6 depicts a flow diagram which illustrates an exemplary method of operating of the adaptive voltage scaling (AVS) slack time detector in the digital processing system of FIG. 1 according to an exemplary embodiment of the present invention.

FIG. 6 depicts flow diagram 600, which illustrates the operation of AVS slack time detector 125 in digital processing system 100 according to an exemplary embodiment of the present invention. Initially, DSP/CPU system 120 sets the value of the FREQUENCY CONTROL signal to establish a new nominal clock operating speed (e.g., 50 MHz) (process step 605). Next, AVS slack time detector 125 monitors the REGCLK signal and determines the amount of slack time, if any. As explained above, the slack time is the time difference between the longest propagation delay in DSP/CPU system 120 and the pulse width of the REGCLK clock signal (process step 610). The longest propagation delay in DSP/CPU system 120 is represented by the total delay, K×D, at the output of the K delay cell 201 and the pulse width of the REGCLK clock signal is the length of time between a rising clock edge and the next falling clock edge of the REGCLK clock signal. Alternatively, the pulse width of the REGCLK clock signal is the length of time between a falling clock edge and the next rising clock edge of the REGCLK clock signal. If the slack time is too large, VDD is decremented (process steps 615 and 620). If the slack time is too small, VDD is incremented (process steps 625 and 630). Otherwise, AVS slack time detector 125 continues to monitor the REGCLK signal and determine the amount of slack time, if any (process step 610).

Although the present invention has been described in detail, those skilled in the art should understand that they can make various changes, substitutions and alterations herein without departing from the spirit and scope of the invention in its broadest form.

What is claimed is:

1. Control circuitry for adjusting a power supply level of a digital processing component having varying operating frequencies, said control circuitry comprising:
   a plurality of delay cells coupled in series, each of said plurality of delay cells having a delay based on a value of the power supply level, such that a clock edge applied to an input of one of the delay cells ripples sequentially through said plurality of delay cells; and
   power supply adjustment circuitry capable of adjusting the power supply level, said power supply adjustment circuitry operable to (i) monitor outputs of at least a first delay cell and a second delay cell immediately following the first delay cell, (ii) determine that said clock edge has reached an output of said first delay cell and has not reached an output of said second delay cell in response to a next sequential clock edge being applied to the delay cell input, and (iii) generate a control signal capable of adjusting the power supply level based on the determination.

2. The control circuitry for adjusting a power supply level as set forth in claim 1 wherein a total delay from said delay cell input to said first delay cell output is greater than a maximum delay of said digital processing component scaled by a constant factor.

3. The control circuitry for adjusting a power supply level as set forth in claim 1 wherein said power supply adjustment circuitry increases the power supply level if said clock edge has not reached said first delay cell output.

4. The control circuitry for adjusting a power supply level as set forth in claim 1 wherein said power supply adjustment circuitry decreases the power supply level if said clock edge has reached said second delay cell output.

5. The control circuitry for adjusting a power supply level as set forth in claim 1 wherein said power supply adjustment circuitry is further operable to monitor outputs of at least a third delay cell immediately preceding the first delay cell, said first delay cell, said second delay cell, and a fourth delay cell immediately following the second delay cell.

6. The control circuitry for adjusting a power supply level as set forth in claim 5 wherein said power supply adjustment circuitry is further operable to determine that said clock edge has reached an output of said third delay cell and said first delay cell output and has not reached said second delay cell output.

7. The control circuitry for adjusting a power supply level as set forth in claim 6 wherein said power supply adjustment circuitry increases the power supply level in relatively large incremental steps if said clock edge has not reached said third delay cell output.

8. The control circuitry for adjusting a power supply level as set forth in claim 7 wherein said power supply adjustment circuitry increases the power supply level in relatively small incremental steps if said clock edge has reached said third delay cell output but has not reached said first delay cell output.

9. The control circuitry for adjusting a power supply level as set forth in claim 6 wherein said power supply adjustment circuitry decreases the power supply level in relatively large incremental steps if said clock edge has reached said second delay cell output and said fourth delay cell output.

10. The control circuitry for adjusting a power supply level as set forth in claim 9 wherein said power supply adjustment circuitry decreases the power supply level in relatively small incremental steps if said clock edge has reached said second delay cell output but has not reached said fourth delay cell output.

11. A method of operating control circuitry for adjusting a power supply level of a digital processing component having varying operating frequencies, said method of operating said control circuitry comprising the steps of:
    applying a clock edge to an input of one of a plurality of delay cells coupled in series, each of said plurality of delay cells having a delay based on a value of the power supply level, said applied clock edge rippling sequentially through said plurality of delay cells;
    monitoring outputs of at least a first delay cell and a second delay cell immediately following the first delay cell;
    determining that said clock edge has reached an output of said first delay cell and has not reached an output of said second delay cell in response to a next sequential clock edge being applied to the delay cell input; and
    generating a control signal capable of adjusting the power supply level based on the determination.

12. The method of operating control circuitry for adjusting a power supply level as set forth in claim 11 wherein a total delay from said delay cell input to said first delay cell output is greater than a maximum delay of said digital processing component scaled by a constant factor.

13. The method of operating control circuitry for adjusting a power supply level as set forth in claim 11 further comprising the step of increasing the power supply level if said clock edge has not reached said first delay cell output.

14. The method of operating control circuitry for adjusting a power supply level as set forth in claim 11 further comprising the step of decreasing the power supply level if said clock edge has reached said second delay cell output.

15. The method of operating control circuitry for adjusting a power supply level as set forth in claim 11 further comprising the step of monitoring outputs of at least a third delay cell immediately preceding the first delay cell, said first delay cell, said second delay cell, and a fourth delay cell immediately following the second delay cell.

16. The method of operating control circuitry for adjusting a power supply level as set forth in claim 15 further comprising the step of determining that said clock edge has reached an output of said third delay cell and said first delay cell output and has not reached said second delay cell output.

17. The method of operating control circuitry for adjusting a power supply level as set forth in claim 16 further comprising the step of increasing the power supply level in relatively large incremental steps if said clock edge has not reached said third delay cell output.

18. The method of operating control circuitry for adjusting a power supply level as set forth in claim 17 further comprising the step of increasing the power supply level in relatively small incremental steps if said clock edge has reached said third delay cell output but has not reached said first delay cell output.

19. The method of operating control circuitry for adjusting a power supply level as set forth in claim 16 further comprising the step of decreasing the power supply level in relatively large incremental steps if said clock edge has reached said second delay cell output and said fourth delay cell output.

20. The method of operating control circuitry for adjusting a power supply level as set forth in claim 19 further comprising the step of decreasing the power supply level in relatively small incremental steps if said clock edge has reached said second delay cell output but has not reached said fourth delay cell output.

21. A digital circuit comprising:
    a digital processing component capable of operating at different clock frequencies;
    an adjustable clock source capable of supplying variable clock frequencies to said digital processing component;
    an adjustable power supply capable of supplying a variable power supply level to said digital processing component; and
    control circuitry for adjusting the power supply level comprising:
        a plurality of delay cells coupled in series, each of said plurality of delay cells having a delay based on a value of the power supply level, such that a clock edge applied to an input of one of the delay cells ripples sequentially through said plurality of delay cells; and
        power supply adjustment circuitry capable of adjusting the power supply level, said power supply adjustment circuitry operable to (i) monitor outputs of at least a first delay cell and a second delay cell immediately following the first delay cell, (ii) determine that said clock edge has reached an output of said first delay cell and has not reached an output of said second delay cell in response to a next sequential clock edge being applied to the delay cell input, and (iii) generate a control signal capable of adjusting the power supply level based on the determination.

22. The digital circuit as set forth in claim 21 wherein a total delay from said delay cell input to said first delay cell output is greater than a maximum delay of said digital processing component.

23. The digital circuit as set forth in claim 21 wherein said power supply adjustment circuitry increases the power supply level if said clock edge has not reached said first delay cell output.

24. The digital circuit as set forth in claim 21 wherein said power supply adjustment circuitry decreases the power supply level if said clock edge has reached said second delay cell output.

25. The digital circuit as set forth in claim 21 wherein said power supply adjustment circuitry is further operable to monitor outputs of at least a third delay cell immediately preceding the first delay cell, said first delay cell, said second delay cell, and a fourth delay cell immediately following the second delay cell.

26. The digital circuit as set forth in claim 25 wherein said power supply adjustment circuitry is further operable to determine that said clock edge has reached an output of said third delay cell and said first delay cell output and has not reached said second delay cell output.

27. The digital circuit as set forth in claim 26 wherein said power supply adjustment circuitry increases the power supply level in relatively large incremental steps if said clock edge has not reached said third delay cell output.

28. The digital circuit as set forth in claim 27 wherein said power supply adjustment circuitry increases the power supply level in relatively small incremental steps if said clock edge has reached said third delay cell output but has not reached said first delay cell output.

29. The digital circuit as set forth in claim 26 wherein said power supply adjustment circuitry decreases the power supply level in relatively large incremental steps if said clock edge has reached said second delay cell output and said fourth delay cell output.

30. The digital circuit as set forth in claim 29 wherein said power supply adjustment circuitry decreases the power supply level in relatively small incremental steps if said clock edge has reached said second delay cell output but has not reached said fourth delay cell output.

* * * * *